(12) United States Patent
Kazuno et al.

(10) Patent No.: US 8,779,020 B2
(45) Date of Patent: Jul. 15, 2014

(54) POLISHING PAD

(75) Inventors: Atsushi Kazuno, Osaka (JP); Kazuyuki Ogawa, Osaka (JP); Masahiko Nakamori, Otsu (JP); Takatoshi Yamada, Otsu (JP); Tetsuo Shimomura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 0 days.

(21) Appl. No.: 13/607,125

(22) Filed: Sep. 7, 2012

(65) Prior Publication Data

US 2013/0005228 A1    Jan. 3, 2013

Related U.S. Application Data

(62) Division of application No. 11/914,547, filed as application No. PCT/JP2006/309380 on May 10, 2006, now Pat. No. 8,304,467.

(30) Foreign Application Priority Data

May 17, 2005  (JP) ................. 2005-144292
May 17, 2005  (JP) ................. 2005-144304
May 17, 2005  (JP) ................. 2005-144318

(51) Int. Cl.
    *C08G 18/10*    (2006.01)

(52) U.S. Cl.
    USPC ........... 521/159; 521/163; 521/170; 521/172; 521/174; 451/526

(58) Field of Classification Search
    USPC ........... 521/159, 163, 170, 172, 174; 451/526
    See application file for complete search history.

(56) References Cited

U.S. PATENT DOCUMENTS

| | | | |
|---|---|---|---|
| 3,198,757 | A | 8/1965 | Considine et al. |
| 4,410,668 | A | 10/1983 | Piccirilli et al. |
| 5,455,113 | A | 10/1995 | Girgis et al. |
| 5,587,502 | A | 12/1996 | Moren et al. |
| 5,614,575 | A | 3/1997 | Kotschwar |
| 5,670,599 | A | 9/1997 | Bassner |
| 5,840,782 | A | 11/1998 | Limerkens et al. |
| 6,439,989 | B1 | 8/2002 | Reinhardt et al. |
| 6,477,926 | B1 | 11/2002 | Swisher et al. |
| 6,706,383 | B1 | 3/2004 | Obeng et al. |
| 6,777,455 | B2 | 8/2004 | Seyanagi et al. |
| 6,837,781 | B2 | 1/2005 | Hishiki |
| 6,887,911 | B2 | 5/2005 | Shidaker et al. |
| 7,094,811 | B2 | 8/2006 | Nodelman et al. |
| 2002/0016139 | A1 | 2/2002 | Hirokawa et al. |
| 2002/0058469 | A1 | 5/2002 | Pinheiro et al. |
| 2002/0078632 | A1 | 6/2002 | Hasegawa et al. |
| 2002/0183409 | A1 | 12/2002 | Seyanagi et al. |
| 2003/0109209 | A1 | 6/2003 | Hishiki |
| 2003/0143931 | A1 | 7/2003 | Hirokawa et al. |
| 2004/0018338 | A1 | 1/2004 | Materniak et al. |
| 2004/0054023 | A1 | 3/2004 | Kaneda et al. |
| 2004/0102137 | A1 | 5/2004 | Allison et al. |
| 2004/0157985 | A1 | 8/2004 | Masui et al. |
| 2004/0224622 | A1 | 11/2004 | Sakurai et al. |
| 2004/0242719 | A1 | 12/2004 | Seyanagi et al. |
| 2005/0064709 | A1 | 3/2005 | Shimomura et al. |
| 2005/0171224 | A1 | 8/2005 | Kulp |
| 2005/0176912 | A1 | 8/2005 | Shin et al. |
| 2005/0222288 | A1 | 10/2005 | Seyanagi et al. |
| 2005/0275135 | A1 | 12/2005 | David et al. |
| 2006/0037699 | A1 | 2/2006 | Nakamori et al. |
| 2006/0078742 | A1 | 4/2006 | Kauffman et al. |
| 2006/0089095 | A1 | 4/2006 | Swisher et al. |
| 2006/0122287 | A1 | 6/2006 | Yamamoto et al. |
| 2006/0280929 | A1 | 12/2006 | Shimomura et al. |
| 2006/0280930 | A1 | 12/2006 | Shimomura et al. |
| 2007/0190905 | A1 | 8/2007 | Shimomura et al. |
| 2008/0085943 | A1 | 4/2008 | Doura et al. |
| 2008/0305720 | A1 | 12/2008 | Hirose et al. |
| 2008/0313967 | A1 | 12/2008 | Sakurai et al. |
| 2009/0047872 | A1 | 2/2009 | Fukuda et al. |
| 2009/0093201 | A1 | 4/2009 | Kazuno et al. |
| 2009/0104850 | A1 | 4/2009 | Ogawa et al. |
| 2009/0253353 | A1 | 10/2009 | Ogawa et al. |
| 2009/0298392 | A1 | 12/2009 | Okamoto et al. |
| 2010/0003896 | A1 | 1/2010 | Nakai et al. |
| 2010/0015893 | A1 | 1/2010 | Kazuno et al. |
| 2010/0048102 | A1 | 2/2010 | Nakai et al. |
| 2011/0218263 | A1 | 9/2011 | Kazuno et al. |

FOREIGN PATENT DOCUMENTS

| | | |
|---|---|---|
| CN | 1407606 | 4/2003 |
| CN | 1487965 | 4/2004 |
| CN | 1586002 | 2/2005 |
| CN | 1602321 | 3/2005 |
| CN | 1628138 | 6/2005 |
| CN | 1671914 | 9/2005 |
| CN | 1684799 | 10/2005 |
| CN | 101115779 | 1/2008 |
| EP | 0 656 031 | 6/1995 |
| EP | 1 647 588 | 4/2006 |
| JP | 2-91279 | 3/1990 |
| JP | 6-220151 | 8/1994 |

(Continued)

OTHER PUBLICATIONS

Notification of the Second Office Action issued Feb. 5, 2013, directed to Chinese Application No. 200780027350.5; 12 pages.
Hearing dated Apr. 9, 2013, directed to Japanese Application No. 2006-005787; 8 pages.
Doura et al., U.S. Office Action mailed Jul. 22, 2010, directed to U.S. Appl. No. 11/794,284; 7 pages.
Doura et al., U.S. Office Action mailed Jan. 6, 2011, directed to U.S. Appl. No. 11/794,284; 5 pages.
Doura et al., U.S. Office Action mailed Jul. 8, 2011, directed to U.S. Appl. No. 11/794,284; 6 pages.

(Continued)

Primary Examiner — John Cooney
(74) Attorney, Agent, or Firm — Morrison & Foerster LLP

(57) ABSTRACT

A polishing pad generates very few scratches on a surface of a polishing object, and is excellent in planarization property. The polishing pad has a high polishing rate and is excellent in planarization property. The polishing pad grooves become very little clogged with abrasive grains or polishing swarf during polishing and, even when continuously used for a long period of time, the polishing rate is scarcely reduced.

8 Claims, 1 Drawing Sheet

(56) References Cited

FOREIGN PATENT DOCUMENTS

| | | |
|---|---|---|
| JP | 8-500622 | 1/1996 |
| JP | 3013105 | 1/1996 |
| JP | 8-71378 | 3/1996 |
| JP | 11-511748 | 10/1999 |
| JP | 2000-17252 | 1/2000 |
| JP | 3516874 | 6/2000 |
| JP | 2000-248034 | 9/2000 |
| JP | 2000-343412 | 12/2000 |
| JP | 2001-47355 | 2/2001 |
| JP | 2001-89548 | 4/2001 |
| JP | 2001-105300 | 4/2001 |
| JP | 2001-513450 | 9/2001 |
| JP | 2001-277101 | 10/2001 |
| JP | 2001-518852 | 10/2001 |
| JP | 2002-59358 | 2/2002 |
| JP | 2002-134445 | 5/2002 |
| JP | 2002-144220 | 5/2002 |
| JP | 2002-239905 | 8/2002 |
| JP | 3455187 | 8/2002 |
| JP | 2002-535843 | 10/2002 |
| JP | 3359629 | 12/2002 |
| JP | 2003-11066 | 1/2003 |
| JP | 2003-62748 | 3/2003 |
| JP | 2003-89051 | 3/2003 |
| JP | 2003-128910 | 5/2003 |
| JP | 2003-145414 | 5/2003 |
| JP | 2003-171433 | 6/2003 |
| JP | 2003-218074 | 7/2003 |
| JP | 2003-224094 | 8/2003 |
| JP | 2004-1169 | 1/2004 |
| JP | 3490431 | 1/2004 |
| JP | 3571334 | 2/2004 |
| JP | 2004-75700 | 3/2004 |
| JP | 2004-167680 | 6/2004 |
| JP | 2004-188716 | 7/2004 |
| JP | 2004-193390 | 7/2004 |
| JP | 2004-211076 | 7/2004 |
| JP | 2004-235446 | 8/2004 |
| JP | 2004-330411 | 11/2004 |
| JP | 2005-52907 | 3/2005 |
| JP | 2005-68174 | 3/2005 |
| JP | 2005-68175 | 3/2005 |
| JP | 2005-120275 | 5/2005 |
| JP | 2005-517060 | 6/2005 |
| JP | 2005-322790 | 11/2005 |
| JP | 2005-354077 | 12/2005 |
| JP | 2006-111880 | 4/2006 |
| JP | 2006-190826 | 7/2006 |
| JP | 2006-231429 | 9/2006 |
| WO | WO-94/04599 | 3/1994 |
| WO | WO-96/38453 | 12/1996 |
| WO | WO-98/45087 | 10/1998 |
| WO | WO-99/07515 | 2/1999 |
| WO | WO-00/43159 | 7/2000 |
| WO | WO-01/96434 | 12/2001 |
| WO | WO-02/24415 | 3/2002 |
| WO | WO-02/083757 | 10/2002 |
| WO | WO-03/043071 | 5/2003 |
| WO | WO-03/066703 | 8/2003 |
| WO | WO-2004/049417 | 6/2004 |
| WO | WO-2004/055089 | 7/2004 |
| WO | WO-2006/095591 | 9/2006 |
| WO | WO-2006/123559 | 11/2006 |

OTHER PUBLICATIONS

Kazuno et al., U.S. Office Action mailed Dec. 6, 2010, directed to U.S. Appl. No. 11/914,547; 15 pages.
Kazuno et al., U.S. Office Action mailed Jun. 23, 2011, directed to U.S. Appl. No. 11/914,547; 12 pages.
Kazuno et al., U.S. Office Action mailed Nov. 28, 2011, directed to U.S. Appl. No. 11/914,547; 8 pages.
Kazuno et al., U.S. Office Action mailed Nov. 10, 2011, directed to U.S. Appl. No. 13/107,347; 7 pages.
Kazuno et al., Office Action mailed Jun. 5, 2012, directed to U.S. Appl. No. 13/107,347; 8 pages.
Ogawa et al., U.S. Office Action mailed Dec. 21, 2010, directed to U.S. Appl. No. 12/065,219; 10 pages.
Ogawa et al., U.S. Office Action mailed May 11, 2011, directed to U.S. Appl. No. 12/065,219; 11 pages.
Ogawa et al., U.S. Office Action mailed Mar. 21, 2012, directed to U.S. Appl. No. 12/065,219; 7 pages.
Fukuda et al., U.S. Office Action mailed Jun. 8, 2011, directed to U.S. Appl. No. 12/095,859; 7 pages.
Nakai et al., U.S. Office Action mailed Nov. 10, 2011, directed to U.S. Appl. No. 12/439,154; 17 pages.
Nakai et al., U.S. Office Action mailed Jun. 7, 2012, directed to U.S. Appl. No. 12/439,154; 17 pages.
Kazuno et al., U.S. Office Action mailed Feb. 28, 2012, directed to U.S. Appl. No. 12/439,135; 6 pages.
Nakai et al., U.S. Office Action mailed Nov. 25, 2011, directed to U.S. Appl. No. 12/593,206; 8 pages.
Nakai et al., U.S. Office Action mailed Jul. 5, 2012, directed to U.S. Appl. No. 12/593,206; 9 pages.
Decision of Rejection mailed Nov. 12, 2010, directed to Chinese Application No. 200780027350.5; 26 pages.
Notification of Reexamination issued Apr. 19, 2012, directed to Chinese Application No. 200780027350.5; 15 pages.
Office Action mailed Aug. 4, 2010, directed to Chinese Application No. 200880008905.6; 7 pages.
Notification of the Third Office Action issued Feb. 29, 2012, directed to Chinese Application No. 200880008905.6; 12 pages.
Notification of the Second Office Action issued on Jun. 17, 2011, directed to Chinese Application No. 200880008905.6; 10 pages.
Office Action issued Apr. 22, 2010, directed to Chinese Application No. 200910135487.3; 17 pages.
Second Office Action issued Apr. 13, 2011, directed to Chinese Application No. 200910135487.3; 16 pages.
Rejection Decision mailed Jul. 29, 2011, directed to Chinese Application No. 200910135487.3; 14 pages.
Office Action issued Jan. 8, 2010, directed to Chinese Application No. 200680004397.5; 25 pages.
Second Office Action issued May 5, 2011, directed to Chinese Application No. 200680004397.5; 21 pages.
Third Office Action mailed Aug. 29, 2011, directed to Chinese Patent Application No. 200680004397.5; 16 pages.
Office Action issued Jul. 10, 2009, directed to Chinese Application No. 200680017384.1; 6 pages.
Office Action issued Nov. 21, 2008, directed to Chinese Application No. 200680017384.1; 9 pages.
Office Action issued Mar. 23, 2010, directed to Chinese Application No. 200910135488.8; 13 pages.
Second Office Action mailed Nov. 23, 2010, directed to Chinese Application No. 200910135488.8; 14 pages.
Office Action mailed Apr. 1, 2010, directed to Chinese Application No. 200780027348.8; 9 pages.
Office Action mailed Mar. 11, 2010, directed to Chinese Application No. 200780027350.5; 17 pages.
Office Action mailed May 8, 2009, directed to Chinese Application No. 2006800321010; 5 pages.
Notification of First Office Action issued Feb. 28, 2012, directed to Chinese Application No. 201110049840.3; 11 pages.
Notification of the Second Office Action issued Sep. 25, 2012, directed to Chinese Application No. 201110049840.3; 13 pages.
Notification of Reasons for Refusal mailed Mar. 15, 2011, directed to Japanese Application No. 2005-144304; 6 pages.
Decision of Refusal mailed Jun. 24, 2011, directed to Japanese Application No. 2005-144304; 4 pages.
Notice of Hearing mailed Nov. 29, 2011, directed to Japanese Application No. 2005-144304; 6 pages.
Notification of Reasons for Refusal mailed Mar. 15, 2011, directed to Japanese Application No. 2005-144292; 6 pages.
Decision of Refusal mailed Jun. 28, 2011, directed to Japanese Application No. 2005-144292; 4 pages.
Notification of Reasons for Refusal mailed Mar. 15, 2011, directed to Japanese Application No. 2005-144318; 6 pages.

(56) References Cited

OTHER PUBLICATIONS

Decision of Refusal mailed Jun. 28, 2011, directed to Japanese Application No. 2005-144318; 4 pages.
Notification of Reasons for Refusal mailed Aug. 17, 2011, directed to Japanese Application No. 2006-006210; 5 pages.
Notification of Reasons for Refusal mailed Aug. 9, 2011, directed to Japanese Application No. 2005-249046; 6 pages.
Notification of Reasons for Refusal mailed Nov. 25, 2010, directed to Japanese Application No. 2006-002346; 4 pages.
Notification of Reasons for Refusal mailed Jul. 12, 2011, directed to Japanese Application No.2006-002346; 6 pages.
Notification of Reasons for Refusal mailed Feb. 14, 2012, directed to Japanese Application No. 2006-002346; 4 pages.
Notification of Reasons for Refusal mailed May 27, 2011, directed to Japanese Application No. 2006-005787; 6 pages.
Notification of Reasons for Refusal mailed Dec. 22, 2011, directed to Japanese Application No. 2006-005787; 4 pages.
Notification of Reasons for Refusal mailed Nov. 25, 2010, directed to Japanese Application No. 2006-005803; 4 pages.
Notification of Reasons for Refusal mailed Oct. 4, 2011, directed to Japanese Application No. 2006-235978; 13 pages.
Notification of Reasons for Refusal mailed Feb. 1, 2012, directed to Japanese Application No. 2007-084785; 8 pages.
International Preliminary Report on Patentability and Written Opinion mailed Jul. 24, 2008, directed to International Application No. PCT/JP2007/050072; 11 pages.
International Search Report mailed Mar. 6, 2007, directed to International Application No. PCT/JP2007/050072; 3 pages.
International Preliminary Report on Patentability, mailed Mar. 13, 2008, directed to International Application No. PCT/JP2006/316372; 6 pages.
International Search Report mailed Nov. 21, 2006, directed to International Application No. PCT/JP2006/316372; 4 pages.
International Search Report mailed Aug. 8, 2006 directed to International Application No. PCT/JP2006/309380;11 pages.
International Search Report mailed Jun. 24, 2008, directed to International Application No. PCT/JP2008/054583; 2 pages.
International Search Report mailed May 30, 2006, directed to International Application No. PCT/JP2006/303605; 4 pages.
International Search Report mailed Nov. 27, 2007, directed to International Application No. PCT/JP2007/065934; 1 page.
International Search Report mailed Nov. 27, 2007, directed to International Application No. PCT/JP2007/066288; 4 pages.
Office Action mailed Jul. 7, 2011, directed to Korean Application No. 10-2009-7013449; 5 pages.
Office Action mailed Jul. 7, 2011, directed to Korean Application No. 10-2009-7013450; 6 pages.
Office Action mailed Nov. 17, 2010, directed to Taiwanese Application No. 096100913; 7 pages.
Office Action mailed May 18, 2011, directed to Taiwanese Patent Application No. 096130712; 10 pages.
Office Action mailed Nov. 24, 2011, directed to Taiwanese Application No. 097109615; 10 pages.
Matsunaga, Katsuharu. (2005). "Hard Foam" Section 7.4.3. In *The Comprehensive Materials and Technology for a Novel Polyurethan Production*. First Print, Kabushiki Kaisha CMC Shuppan, pp. 107-108.
Nakai et al., U.S. Office Action mailed Sep. 9, 2013, directed to U.S. Appl. No. 12/593,206; 5 pages.
Nakai et al., U.S. Office Action mailed Dec. 18, 2012, directed to U.S. Appl. No. 12/439,154; 19 pages.
Nakai et al., U.S. Office Action mailed May 9, 2013, directed to U.S. Appl. No. 12/593,206; 5 pages.
Nakai et al., U.S. Office Action mailed Jul. 11, 2013, directed to U.S. Appl. No. 12/439,154; 17 pages.
Notification of Reexamination issued May 31, 2013, directed to Chinese Application No. 200910135487.3; 11 pages.
Nakai et al., U.S. Office Action mailed Jan. 17, 2014, directed to U.S. Appl. No. 12/439,154; 13 pages.
Nakai, et al., U.S. Office Action mailed Mar. 21, 2014, directed towards U.S. Appl. No. 12/593,206; 8 pages.

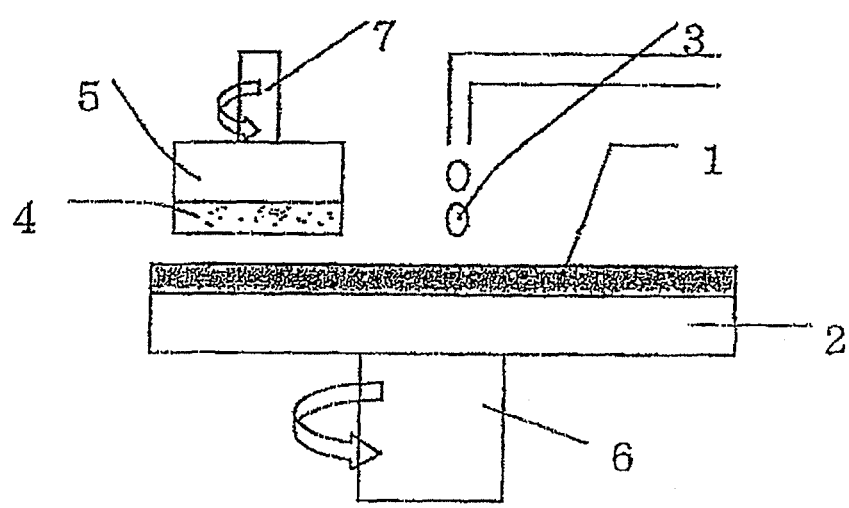

POLISHING PAD

REFERENCE TO RELATED APPLICATIONS

This application is a divisional of U.S. Ser. No. 11/914,547, filed Nov. 15, 2007, which is a national stage application under 35 USC 371 of International Application No. PCT/JP2006/309380, filed May 10, 2006, which claims the priority of Japanese Patent Application Nos. 2005-144292, 2005-144304 and 2005-144318, each filed May 17, 2005, the contents of which are incorporated herein by reference.

FIELD OF THE INVENTION

The invention relates to a polishing pad capable of performing planarization materials requiring a high surface planarity such as optical materials including a lens and a reflective mirror, a silicon wafer, a glass substrate or an aluminum substrate for a hard disk and a product of general metal polishing with stability and a high polishing efficiency. A polishing pad of the invention is preferably employed, especially, in a planarization step of a silicon wafer or a device on which an oxide layer or a metal layer has been formed prior to further stacking an oxide layer or a metal layer thereon.

BACKGROUND OF THE INVENTION

Typical materials requiring surface flatness at high level include a single-crystal silicon disk called a silicon wafer for producing semiconductor integrated circuits (IC, LSI). The surface of the silicon wafer should be flattened highly accurately in a process of producing IC, LSI etc., in order to provide reliable semiconductor connections for various coatings used in manufacturing the circuits in each steps of stacking an oxide layer or metal layer thereon. In the step of polishing finish, a polishing pad is generally stuck on a rotatable supporting disk called a platen, while a workpiece such as a semiconductor wafer is stuck on a polishing head. By movement of the two, a relative speed is generated between the platen and the polishing head while polishing slurry having abrasive grains is continuously supplied to the polishing pad, to effect polishing processing.

As polishing characteristic of a polishing pad, it is requested that a polishing object is excellent in planarity and in-plane uniformity and a polishing rate is large. A planarity and in-plane uniformity of a polished object can be improved to some extent with a polishing layer higher in an elastic modulus.

In view of development in next generation elements, a polishing pad having a higher hardness which can further improve planarity is required. In order to improve planarity, it is possible to use a non-foam-based hard polishing pad. However, when such the hard pad is used, there arises a problem that a surface to be polished of a polishing object is scratched. In addition, since the non-foam-based polishing pad cannot sufficiently retain abrasive grains in slurry on a pad surface at polishing processing, this is not desirable also from a viewpoint of a polishing rate.

In addition, a polishing pad in which a water-soluble material is dispersed in a thermoplastic polymer has been disclosed (Japanese Patent Application Laid-open (JP-A) No. 2001-47355). Although this polishing pad is a non-foam, since a water-soluble material dispersed in a polishing pad is dissolved at polishing, a pore like a foam is formed on a polishing pad surface, a polishing pad is swollen, and a hardness of a polishing pad surface is reduced, the pad is effective for reducing a scratch and improving a polishing rate. However, since a surface of the polishing pad is swollen, and a hardness is reduced, planarization property is insufficient.

In addition, for the purpose of realizing both of improvement in planarity and reduction in scratch, there is disclosed a polishing pad comprising a polymer of an isocyanate-terminal prepolymer obtained by reacting a high-molecular-weight polyol containing an organic polyisocyanate and a water-soluble polyol and a low molecular polyol, and a chain extender (Japanese Patent No. 3571334). However, since a surface of the polishing pad is swollen, and a hardness is reduced, planarization property required in the future cannot be sufficiently satisfied.

On the other hand, a polishing rate can be improved by using a foam containing pores, thereby, increasing an amount of slurry to be retained.

As a polishing pad satisfying the aforementioned properties, a polishing pad comprising a polyurethane resin foam has been disclosed (JP-A No. 2000-17252 and Japanese Patent No. 3359629). The polyurethane resin foam is produced by reacting an isocyanate-terminal prepolymer and a chain extender (curing agent) and, as a high-molecular-weight polyol component of an isocyanate prepolymer, polyether (particularly polytetramethylene glycol having a number average molecular weight of 500 to 1600) and polycarbonate polyol are used as a suitable material, from a viewpoint of hydrolysis resistance, elasticity property, and abrasion resistance.

However, when a modulus of a polishing layer is increased (increase in a hardness) for improving planarization property of a polishing pad, a specific gravity is increased and, as a result, there is a problem that the number of pores per unit area is decreased, and a polishing rate is reduced.

In addition, as a method of increasing an amount of slurry to be retained, there is a method of rendering a polishing pad itself hydrophilic, specifically, (1) a method of introducing a hydrophilic group such as a hydroxyl group etc. into a matrix material, and (2) a method of mixing a matrix material and a hydrophilic material. For example, a composition for a polishing pad containing (A) a crosslinking elastomer and (B) a material having a functional group such as a hydroxyl group etc. is disclosed (JP-A No. 2002-134445). In addition, a polishing equipment obtained by further adding a hydrophilic material, to a material constituting a polishing equipment, or adding a hydrophilic group thereto (modification) is disclosed (JP-A No. 2003-11066). In addition, a polishing pad comprising a thermosetting polymer matrix resin which is hydrophilic, and contains a substantially water-insoluble sheet is disclosed (JP-A No. 2002-59358). Further, a polishing pad comprising a polyurethane composition containing a urethane resin obtained by copolymerizing a compound having a hydrophilic group, and containing a hydrophilizing agent is disclosed (JP-A No. 2003-128910).

However, in the (1) method, when a matrix material is polyurethane, a hydrophilic group containing active hydrogen of a hydroxyl group etc. is reacted with an isocyanate group upon synthesis of polyurethane and, as a result, an unreacted polyol component may remain in a material. And, there is a tendency that since this remaining polyol component exerts the plastic effect, physical property of a polishing pad is deteriorated. In addition, in the (2) method, it is difficult to uniformly mix a hydrophilic material into a matrix material, and a polishing pad having uniform physical property cannot be obtained.

On the other hand, if a polishing rate varies during from immediately after use to completion of use, polishing condition must be adjusted and there is a problem that a polishing efficiency is worse.

For example, for the purpose of providing a non-foam urethane polishing material which can effectively polish a semiconductor wafer and is excellent in planarity, there is disclosed a polishing material comprising a polishing material composition which comprises an isocyanate-terminal urethane prepolymer and an active hydrogen-containing compound and in which the isocyante-terminal urethane prepolymer is obtained by using, as polyisocyante, aromatic diisocyante, and using a polyol component consisting of a high-molecular-weight polyol and a low-molecular polyol, the low-molecular polyol in the polyol component being diethylene glycol, 1,3-butylene glycol etc. (JP-A No. 2000-17252).

In addition, for the purpose of imparting dressing property to a polishing cloth itself and prolonging a polishing life, a polishing cloth comprising a polyurethane composition and having an abrasion amount by a Taber abrasion test of 150 to 350 mg is disclosed (JP-A No. 2001-277101).

However, the polishing material described in JP-A No. 2000-17252 comprises a non-foam urethane, and since such the non-foam-based polishing material has a low polishing rate, a groove is foamed on a polishing surface, and it is very difficult to stabilize a polishing rate due to local presence of abrasive grains and polishing swarf in slurry. In addition, since the polishing cloth described in JP-A No. 2001-277101 is easily abraded, and has a low hardness (due to not uniform pores, and a large pore size), planarity and in-plane uniformity are not sufficient, and a greater change in a polishing rate cannot be avoided.

Further, the previous polishing pad with a groove has a problem that a groove is clogged with abrasive grains or polishing swarf during polishing, and a polishing rate is reduced during use.

In addition, Japanese Patent Application National Publication (Laid Open) No. 2001-513450, Japanese Patent Application National Publication (Laid Open) No. 2001-518852 and Japanese Patent Application National Publication (Laid Open) No. 2002-535843 disclose a polishing pad comprising a polishing material having a breaking extension of 500% or lower. However, technical meaningfulness of use of a pressing material having a breaking extension of 500% or lower is not described at all.

SUMMARY OF THE INVENTION

An object of the first invention is to provide a polishing pad which hardly generates a scratch on a surface of a polishing object, and is excellent in planarization property. An object of the second invention is to provide a polishing pad which has a high polishing rate and is excellent in planarization property. An object of the third invention is to provide a polishing pad in which a groove is scarcely clogged with abrasive grains or polishing swarf during polishing and, even when continuously used for a long period of time, a polishing rate is scarcely reduced. In addition, another object is to provide a process for manufacturing a semiconductor device using the polishing pad.

In order to solve the aforementioned problems, the present inventors intensively continued to study and, as a result, found out that the aforementioned objects can be attained by the following polishing pad, which resulted in completion of the invention.

That is, the first invention relates to a polishing pad comprising a polishing layer consisting of a polyurethane resin foam having fine cell structure, wherein the polyurethane resin foam has a tensile breaking extension of 25 to 120%.

The present inventors found out that, by adjusting a tensile breaking extension of a polyurethane resin foam which is a material for forming a polishing layer at 25 to 120%, both of reduction in a scratch and improvement in planarization property can be realized.

When a tensile breaking extension of a polyurethane resin foam is less than 25%, it becomes easy to cause a scratch on a wafer surface. In addition, surface abrasion of a polishing layer becomes greater than necessary, leading to shortening of a life of polishing pad, and fuzzing on a polishing layer surface after dressing is immediately removed at wafer polishing, and a polishing rate is reduced. On the other hand, when the extension exceeds 120%, planarization property is deteriorated. In addition, "toughness" of a polyurethane resin becomes great, and a dressing swarf at dressing becomes great. As a result, a fine pore or a groove on a polishing pad surface is clogged with dressing swarf, and a polishing rate is reduced. The tensile breaking extension is preferably 40 to 100%, more preferably 50 to 90%.

The polyurethane resin foam is a reaction cured body of one or two or more kinds of isocyanate-terminal prepolymers containing a high-molecular-weight polyol component and an isocyanate component, and a chain extender, and it is preferable that a NCO wt % (in the case of two or more blends, average NCO wt %) of the isocyanate-terminal prepolymer is 9.3 to 15 wt %. A polyurethane resin foam obtained by a prepolymer method is excellent in polishing property, being preferable.

There is a tendency that as a NCO wt % is increased, a tensile breaking extension is reduced and, as a NCO wt % is reduced, a tensile breaking extension is increased. By adjusting a NCO wt % in a specified range, a tensile breaking extension of a polyurethane resin foam can be easily adjusted in the range, as described above. It is preferable that a NCO wt % of the isocyanate-terminal prepolymer is 10 to 11 wt %.

In the first invention, the high-molecular-weight polyol component is a high-molecular-weight polyol A having a number average molecular weight of 500 to 850 and a high-molecular-weight polyol B having a number average molecular weight of 900 to 1500, and it is preferable that its content ratio is A/B=36/64 to 99/1 (wt %). When a content ratio of a high-molecular-weight polyol A is less than 36 wt %, there is a tendency that planarization property is deteriorated. In addition, "toughness" of a polyurethane resin becomes great, and a dressing swarf at dressing becomes great. As a result, a fine pore or a groove on a polishing pad surface is clogged with dressing swarf, and a polishing rate is reduced. On the other hand, when the ratio exceeds 99 wt %, there is a tendency that a scratch is generated on a wafer surface. In addition, surface abrasion of a polishing layer becomes greater than necessary, a life of a polishing pad is shortened, and fuzzing on a polishing layer surface at dressing is immediately removed at wafer polishing, resulting in a reduced polishing rate.

A specific gravity of a polyurethane resin foam is preferably in the range of from 0.7 to 0.85 and more preferably in the range of from 0.75 to 0.85. If a specific gravity is less than 0.7, various tendencies arise that a hardness of all of the polishing layer is decreased to thereby deteriorate a planarization characteristic, a life of a polishing pad is shortened because of a larger surface wear of a polishing layer than necessary and a polishing rate is rendered smaller because of immediate removal of fluffiness on the surface of a polishing pad after dressing during polishing. On the other hand, when a specific gravity exceeds 0.85, a dressing swarf at dressing becomes great, a groove or a fine pore is clogged with dressing swarf, resulting in clogging, and there is a tendency that a polishing rate is reduced.

In addition, a polyurethane resin foam has an Askar D hardness of preferably 56 to 70 degree, more preferably 56 to 65 degree. When an Askar D hardness is less than 56 degree, there is a tendency that planarity of a polishing object is reduced. On the other hand, when the hardness is greater than 70 degree, planarity is better, but there is a tendency that in-plane uniformity of a polishing object is reduced. In addition, it becomes easy to cause a scratch on a surface of a polishing object.

In addition, it is preferable that a polyurethane resin foam has a tensile strength of 15 to 25 MPa. When a tensile strength is less than 15 MPa, there is a tendency that planarization property is deteriorated and, the other hand, when the strength exceeds 25 MPa, it becomes easy to cause a scratch on a surface of a polishing object.

In the first invention, a chain extender is preferably aromatic diamine, particularly preferably, 3,5-bis(methylthio)-2,4-toluenediamine and/or 3,5-bis(methylthio)-2,6-toluenediamine. By using aromatic diamine and a chain extender, reactivity can be sufficiently maintained even at a low specific gravity and, since a modulus of a polishing layer can be increased, planarity and in-plane uniformity of a polishing object are improved. 3,5-bis(methylthio)-2,4-toluenediamine and 3,5-bis(methylthio)-2,6-toluenediamine are aromatic diamine having no chlorine, and they are preferable material from a viewpoint of environmental aspect at wasting.

It is preferable that the isocyanate-terminal prepolymer further contains a low-molecular polyol component. In addition, it is preferable that an isocyanate component is aromatic diisocyanate and cycloaliphatic diisocyanate. Further, it is preferable that aromatic diisocyanate is toluene diisocyanate, and cycloaliphatic diisocyanate is dicyclohexylmethane diisocyanate. When the above raw material is used, a polishing pad which not only easily adjusts a tensile breaking extension of a polyurethane resin foam, but also is excellent in polishing property can be obtained.

In addition, in the first invention, the polyurethane resin foam contains a silicone-based nonionic surfactant having no hydroxyl group at preferably not less than 0.05% by weight and less than 5% by weight, more preferably 0.5 to 4.5% by weight. When an amount of a silicone-based nonionic surfactant is less than 0.05% by weight, a tensile breaking extension is not less than 25%, and there is a tendency that a polyurethane resin foam having fine cells is not obtained. On the other hand, when the amount is not less than 5% by weight, the number of pores in a foam is increased too much, and there is a tendency that a polyurethane resin foam having a tensile breaking extension of 120% or lower is hardly obtained.

The second invention relates to a polishing pad having a polishing layer comprising a polyurethane resin foam having fine cells, characterized in that a high-molecular-weight polyol component which is a raw material component of the polyurethane resin foam is a hydrophobic high-molecular-weight polyol having a number average molecular weight of 500 to 850, and the polyurethane resin foam contains a silicone-based nonionic surfactant having no hydroxyl group at 10 to 20% by weight.

The polishing pad of the second invention has a high polishing rate, and is excellent in planarization property.

The present inventors found out that, by using a hydrophobic high-molecular-weight polyol having a number average molecular weight of 500 to 850 as a high-molecular-weight polyol component which is a raw material component of a polyurethane resin foam, a molecular weight between crosslinkings of polyurethane can be reduced, and a modulus can be increased without increasing a specific gravity of a polyurethane resin foam (without reducing the number of foams). In addition, when a hydrophobic high-molecular-weight polyol having a number average molecular weight of 500 to 850 is used, since dressing property of a polyurethane resin is enhanced, fuzzing on a polishing layer surface after dressing is immediately removed at wafer polishing, and hydrophobicity of a polyurethane resin is enhanced, resulting in deterioration in compatibility with slurry. As a result, a polishing rate tends to decrease. The present inventors found out that the aforementioned problem of reduction in a polishing rate can be solved by using of a hydrophobic high-molecular-weight polyol having a number average molecular weight of 500 to 850 and a specified amount of a silicone-based nonionic surfactant. In addition, by using the hydrophobic high-molecular-weight polyol, brittleness of a polyurethane resin foam is increased, and processability of a polishing layer tends to be remarkably deteriorated, but it was found out that a problem of processability can be solved by blending a specified amount of a silicone-based nonionic surfactant.

When a number average molecular weight of the hydrophobic of high-molecular-weight polyol is less than 500, brittleness of a polyurethane resin foam becomes too high, chipping or cracking occurs in a polishing layer, surface abrasion of a polishing layer becomes greater than necessary, a life of a polishing pad is shortened, fuzzing on a polishing layer surface after dressing is immediately removed at wafer polishing, and a polishing rate is reduced. On the other hand, when a number average molecular weight exceeds 850, it becomes difficult to increase a modulus of a polishing layer (increase in hardness), and planarization property cannot be improved.

A number average molecular weight of the hydrophobic high-molecular-weight polyol is preferably 550 to 800, more preferably 600 to 700.

In addition, it is necessary that the polyurethane resin foam contains a silicone-based nonionic surfactant having no hydroxyl group at 10 to 20% by weight, preferably 11 to 15% by weight. When a content of a silicone-based nonionic surfactant is less than 10% by weight, brittleness of a polyurethane resin foam becomes too high, chipping or cracking occurs in a polishing layer, and processability is remarkably deteriorated. In addition, since dressing property of a polyurethane resin is enhanced, hydrophobicity of a polyurethane resin becomes too strong, and compatibility with slurry is deteriorated, a polishing rate tends to decrease. On the other hand, when the content exceeds 20% by weight, it becomes difficult to increase a modulus of a polishing layer (increase in a hardness) due to excessive increase in the number of pores in a foam, and planarization property cannot be improved.

It is preferable that the polyurethane resin foam is a reaction cured body of an isocyanate-terminal prepolymer containing the hydrophobic high-molecular-weight polyol and an isocyanate component, and a chain extender. A polyurethane resin foam obtained by a prepolymer method is excellent in polishing property, being preferable.

In the second invention, it is preferable that the hydrophobic high-molecular-weight polyol is a polyester polyol in order to enhance an aggregating force of a polyurethane resin, and maintain high rigidity. In addition, it is also a preferable aspect that a hydrophobic high-molecular-weight polyol is polytetramethylene glycol.

In addition, it is preferable that the isocyanate component is aromatic diisocyanate and cycloaliphatic diisocyanate. It is further preferable that aromatic diisocyanate is toluene diisocyanate, and cycloaliphatic diisocyanate is dicyclohexylmethane diisocyanate. When the aforementioned raw materials are used, a polishing pad which not only easily adjusts physical property of a polyurethane resin foam, but also is excellent in polishing property can be obtained.

In addition, in the second invention, it is preferable that a chain extender is aromatic diamine. By using aromatic diamine as a chain extender, it becomes easy to adjust a curing time, a specific gravity and a hardness of a polishing layer etc. In addition, it is preferable that the aromatic diamine is non-halogen-based aromatic diamine in view of an environmental aspect.

The polyurethane resin foam has a specific gravity of preferably 0.65 to 0.86, more preferably 0.7 to 0.8. When a specific gravity is less than 0.65, there is a tendency that a surface hardness of a polishing layer is reduced, planarity of a polishing object (wafer) is reduced, and life property is deteriorated. On the other hand, when a specific gravity exceeds 0.86, there is a tendency that the number of pores per unit area is decreased, and a polishing rate is reduced.

It is preferable that the polyurethane resin foam has an Askar D hardness of 50 to 65 degree. When an Askar D hardness is less than 50 degree, planarity of a polishing object is reduced and, when the hardness is greater than 65 degree, planarity is better, but in-plane uniformity of a polishing subject tends to decrease.

It is preferable that the polyurethane resin foam has a tensile strength of 15 to 25 MPa. When a tensile strength is less than 15 MPa, planarization property of a polishing pad tends to decrease and, on the other hand, the strength exceeds 25 MPa, it becomes easy to cause a scratch on a polishing object (wafer).

It is preferable that the polyurethane resin foam has a tensile breaking extension of 25 to 100%. When a tensile breaking extension is less than 25%, there is a tendency that surface abrasion becomes greater than necessary, a life of a polishing pad is shortened, fuzzing on a polishing layer surface after dressing is immediately removed at wafer polishing, and a polishing rate is reduced. On the other hand, when the extension exceeds 100%, planarity of a polishing object tends to decrease.

Also, the second invention relates to a process for manufacturing a polishing pad comprising a step (1) of mixing a first component comprising an isocyanate-terminal prepolymer and a second component comprising a chain extender, and curing the mixture to prepare a polyurethane resin foam, wherein the step (1) is a step of adding a silicone-based nonionic surfactant having no hydroxyl group to a first component comprising an isocyanate-terminal prepolymer so that a content of the surfactant becomes 10 to 20% by weight, stirring the first component with a non-reactive gas to prepare a bubble dispersion liquid in which the non-reactive gas is dispersed as a fine bubble, mixing a second component comprising a chain extender into the bubble dispersion liquid, and curing the mixture to prepare a polyurethane resin foam, and a high-molecular-weight polyol component which is a raw material component of the isocyanate-terminal prepolymer is a hydrophobic high-molecular-weight polyol having a number average molecular weight of 500 to 850, and a polishing pad manufactured by the process.

The third invention relates to a polishing pad which comprises a polyurethane resin foam having fine cells and contains a polishing layer having a depression and protrusion structure on a polishing surface, characterized in that the polyurethane resin foam has an Ascar D hardness of 45 to 55 degree, a specific gravity of 0.8 to 0.86, and a tensile breaking extension of 120 to 150%.

In the case where the previous polishing pad with a groove is used, as the reason why a polishing rate is gradually reduced as polishing processing is performed, the following reason is considered. On a surface of the polishing pad with a groove, a groove or a fine pore is provided in order to retain or renew a polishing slurry, and remove generated polishing swarf. However, in the previous polishing pad, a groove or a fine pore is easily clogged with abrasive grains or polishing swarf in a polishing slurry. For this reason, it is necessary to frequently grind a polishing pad surface with dressing to renew into a new surface. The reason why the previous polishing pad is clogged is that 1) a specific gravity of a polishing layer is high, and 2) a material itself of a polishing layer has "toughness". Particularly, when a material itself of a polishing layer has "toughness", it is considered that a polishing swarf of a polishing layer generated at polishing becomes great, the polishing swarf is clogged into a groove or a fine pore, easily causing clogging. When a specific gravity of a polishing layer is simply reduced, planarization property is deteriorated, surface abrasion of a polishing layer becomes greater than necessary, a life of polishing pad is shortened, fuzzing on a polishing layer surface after dressing is immediately removed at wafer polishing, and a polishing rate is reduced, being not preferable.

The present inventors found out that, by adjusting an Askar D hardness of a polyurethane resin foam which is a material for forming a polishing layer at 45 to 55 degree, a specific gravity of the foam at 0.8 to 0.86, and a tensile breaking extension of the foam at 120 to 150%, a hardness can be reduced without reducing a specific gravity of a polishing layer, and "toughness" of a polyurethane resin is suitably reduced to make a polishing swarf small, thereby, clogging can be suppressed.

When an Askar D hardness of a polyurethane resin foam is less than 45 degree, planarity of a polishing object is reduced. On the other hand, when the hardness is greater than 55 degree, planarity is better, but in-plane uniformity of a polishing object tends to decrease. It is preferable that an Askar D hardness of the polyurethane resin foam is 49 to 54 degree.

In addition, when a specific gravity of a polyurethane resin foam is less than 0.8, planarization property is deteriorated, surface abrasion of a polishing layer becomes greater than necessary, a life of a polishing pad is shortened, fuzzing on a polishing layer surface after dressing is immediately removed at wafer polishing, and a polishing rate is reduced. On the other hand, when a specific gravity exceeds 0.86, a dressing swarf at dressing becomes great, the dressing swarf is clogged into a groove or a fine pore, causing clogging, and a polishing rate is reduced. It is preferable that a specific gravity of the polyurethane resin foam is 0.8 to 0.83.

In addition, when a tensile breaking extension of a polyurethane resin foam is less than 120%, surface abrasion of a polishing layer becomes greater than necessary, a life of a polishing pad is shortened, fuzzing on a polishing layer surface after dressing is immediately removed at wafer polishing, and a polishing rate is reduced. On the other hand, when the extension exceeds 150%, since "toughness" of a polyurethane resin itself becomes too great, a dressing swarf at dressing becomes great. As a result, a dressing swarf is clogged into a groove or a fine pore, causing clogging, and a polishing rate is reduced. It is preferable that a tensile breaking extension of the polyurethane resin foam is 125 to 145%.

It is preferable that the polyurethane resin foam is a reaction cured body of one or two or more kinds of isocyanate-terminal prepolymers containing a high-molecular-weight polyol component and an isocyanate component, and a chain extender, and a NCO wt % (in the case of two or more blends, average NCO wt %) is 9.3 to 10.5% by weight. A polyurethane resin foam obtained by a prepolymer method is excellent in polishing property, being preferable.

There is a tendency that as a NCO wt % becomes greater, a tensile breaking extension is reduced and, as a NCO wt % is reduced, a tensile breaking extension becomes greater. As described above, by adjusting a NCO wt % in a specified range, a tensile breaking extension of a polyurethane resin foam can be easily adjusted in the range. It is preferable that a NCO wt % of the isocyanate-terminal prepolymer is 9.4 to 10% by weight.

In the third invention, it is preferable that the high-molecular-weight polyol component is a high-molecular-weight polyol A having a number average molecular weight of 500 to 850, and a high-molecular-weight polyol B having a number average molecular weight of 900 to 1500, and its content ratio is A/B=5/95 to 35/65 (wt %). When a content ratio of a high-molecular-weight polyol A is less than 5% by weight, since "toughness" of a polyurethane resin itself becomes too great, a dressing swarf at dressing becomes great. As a result, a dressing swarf is clogged into a groove or a fine pore, causing clogging, and a polishing rate becomes unstable. On the other hand, when the ratio exceeds 35% by weight, brittleness of a polyurethane resin is increased, and life property of a polishing pad is deteriorated. In addition, a scratch is easily generated.

In addition, it is preferable that a polyurethane resin foam has a tensile strength of 15 to 25 MPa. When a tensile strength is less than 15 MPa, planarization property is deteriorated and, on the other hand, when a tensile strength exceeds 25 MPa, a scratch tends to be generated.

In the third invention, a chain extender is preferably aromatic diamine, particularly preferably 3,5-bis(methylthio)-2,4-toluenediamine and/or 3,5-bis(methylthio)-2,6-toluenediamine. Since reactivity can be sufficiently maintained, and a modulus of a polishing layer can be further increased by using aromatic diamine as a chain extender, planarity and in-plane uniformity of a polishing object are improved. 3,5-bis(methylthio)-2,4-toluenediamine and 3,5-bis(methylthio)-2,6-toluenediamine are aromatic diamine containing no chlorine, and they are a particularly preferable material from a viewpoint of an environmental aspect at wasting.

It is preferable that the isocyanate-terminal prepolymer further contains a low-molecular polyol component. In addition, it is preferable that an isocyanate component is aromatic diisocyanate and cycloaliphatic diisocyanate. It is further preferable that aromatic diisocyanate is toluene diisocyanate, and cycloaliphatic diisocyanate is dicyclohexyl methane diisocyanate. When the aforementioned raw materials are used, a polishing pad which not only easily adjusts a hardness, a specific gravity and a tensile breaking extension of a polyurethane resin foam, but also is excellent in polishing property can be obtained.

In addition, in the third invention, the polyurethane resin foam contains a silicone-based nonionic surfactant having no hydroxyl group at preferably 0.05 to 10% by weight, more preferably 0.5 to 10% by weight. When an amount of a silicone-based nonionic surfactant is less than 0.05% by weight, there is a tendency that a foam of fine pores is not obtained. On the other hand, when the amount exceeds 10% by weight, there is a tendency that the number of pores in a foam is increased too much, and an objective polyurethane resin foam is hardly obtained.

In addition, a dressing speed of the polishing pad of the third invention is preferably 5 to 10 μm/min, more preferably 6 to 8 μm/min. When a dressing speed is less than 5 μm/min, a dressing swarf at dressing becomes great, a dressing swarf is clogged into a groove or a fine pore, causing clogging, and a polishing rate tends to decrease. On the other hand, when a dressing speed exceeds 10 μm/min, there is a tendency that surface abrasion of a polishing layer becomes greater than necessary, a life of a polishing pad is shortened, fuzzing on a polishing layer surface after dressing is immediately removed at wafer polishing, and a polishing rate is reduced.

Also, the invention relates to a process for manufacturing a semiconductor device, comprising a step of polishing a surface of a semiconductor wafer using the aforementioned polishing pad.

BRIEF DESCRIPTION OF THE DRAWINGS

FIG. 1 is a schematic view showing an example of construction of a polishing apparatus used in CMP.

DETAILED DESCRIPTION OF THE INVENTION

The polishing pad of the first to third inventions has a polishing layer consisting of a polyurethane resin foam having fine cell structure. The polishing pad of the invention may contain only the polishing layer, or may be a laminate of a polishing layer and other layer (e.g. cushion layer etc.).

Since a polyurethane resin is excellent in abrasion resistance, and a polymer having desired physical property can be easily obtained by various changing a low material composition, the resin is a particularly preferable as a material for forming a polishing layer.

The polyurethane resin is constituted of an isocyanate component, a polyol component (a high-molecular-weight polyol component and a low-molecular-weight polyol component) and a chain extender.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

Among the aforementioned isocyanate components, it is preferable to use aromatic diisocyanate and cycloaliphatic diisocyanate jointly, and it is particularly preferable to use toluene diisocyanate and dicyclohexylmethane diisocyanate jointly.

As the high-molecular-weight polyol, a compound known in the field of polyurethane can be used without particular limitation. The high-molecular-weight polyol includes, for example, polyether polyols represented by polytetramethylene ether glycol and polyethylene glycol, polyester polyols represented by polybutylene adipate, polyester polycarbonate polyols exemplified by reaction products of polyester glycols such as polycaprolactone polyol and polycaprolactone with alkylene carbonate, polyester polycarbonate polyols obtained by reacting ethylene carbonate with a multivalent alcohol and reacting the resulting reaction mixture with an organic dicarboxylic acid, and polycarbonate polyols obtained by ester exchange reaction of a polyhydroxyl compound with aryl carbonate. These may be used singly or as a mixture of two or more thereof.

No limitation is imposed on a number-average molecular weight of a high-molecular-weight polyol but it is preferably in the range of from 500 to 2000 from the viewpoint of an elastic characteristic of an obtained polyurethane resin. If a number-average molecular weight thereof is less than 500, a polyurethane resin obtained by using the polyol does not have a sufficient elastic characteristic and easy to be fragile, and a polishing pad made from the polyurethane resin is excessively hard, which sometimes causes scratches to be generated on a surface of an object to be polished. Moreover, since a polishing pad is easy to be worn away, it is unpreferable from the viewpoint of a life of a polishing pad. On the other hand, if a number-average molecular weight thereof exceeds 2000, a polishing pad made from a polyurethane resin obtained from such a polyol is unpreferably soft to thereby disable a sufficiently satisfiable planarity to be earned.

In this regard, in the second invention, as a high-molecular-weight polyol component, a hydrophobic high-molecular-weight polyol having a number average molecular weight of 500 to 850 is used.

The hydrophobic high-molecular-weight polyol has no hydrophilic group other than a hydroxyl group which reacts with an isocyanate group.

A hydrophilic group other than a hydroxyl group is generally a functional group or a salt containing an element such as oxygen, nitrogen and sulfur and, examples include functional groups such as $-NH_2$, $-CONH_2$, $-NHCONH_2$, $-SH$, $-SO_3H$, $-OSO_3H$, $-(CH_2CH_2O)n-$, and $-COOH$, and salts such as $-SO_3M$ (M:alkali metal), $-OSO_3M$, $-COOM$, and $-NR_3X$ (R:alkyl group, X:halogen).

Examples of the hydrophobic high-molecular-weight polyol include a hydroxyl-terminal polyester polyol, a polycarbonate polyol, a polyester polycarbonate polyol, a polyether polyol, a polyether polycarbonate polyol, a polyester amide, a phenol resin polyol, an epoxy polyol, a polybutadiene polyol, and a polyisoprene polyol.

Examples of the polyester polyol include polypropylene adipate, polybutylene adipate, polyhexamethylene adipate, and polycaprolactone polyol.

Examples of the polyether polyol include polyhexamethylene glycol (PHMG), polytetramethylene glycol (PTMG), and polypropylene glycol (PPG).

Examples of the polyether polycarbonate polyol include reaction products of a diol such as 1,3-propanediol, 1,4-butanediol, 1,6-hexanediol, polypropylene glycol and/or polytetramethylene glycol with phosgene, diallyl carbonate (e.g. diphenyl carbonate) or cyclic carbonate (e.g. propylene carbonate).

Examples of the polyester polycarbonate polyol include reaction products of polyester glycol such as polycaprolactone polyol etc. with alkylene carbonate, and products obtained by reacting ethylene carbonate and a polyhydric alcohol, and reacting the resulting reaction mixture with organic dicarboxylic acid.

The aforementioned hydrophobic high-molecular-weight polyols may be one kind of the polyols, or two or more kinds may be used jointly.

In the second invention, it is preferable that the hydrophobic high-molecular-weight polyol is polyester polyol. In addition, it is also a preferable aspect that the hydrophobic high-molecular-weight polyol is polytetramethylene glycol.

In the first invention, it is preferable to use a high-molecular-weight polyol A having a number average molecular weight of 500 to 850 and a high-molecular-weight polyol B having a number average molecular weight of 900 to 1500 jointly. It is further preferable that both high-molecular-weight polyols are hydrophobic. By using both high-molecular-weight polyols jointly, a tensile breaking extension of a polyurethane resin foam can be adjusted in a range of 25 to 120%. A ratio of blending a high-molecular-weight polyol A and a high-molecular-weight polyol B is preferably A/B=36/64 to 99/1 (wt %), more preferably A/B=38/62 to 80/20 (wt %), further preferably A/B=40/60 to 70/30 (wt %).

In the third invention, it is preferable to use a high-molecular-weight polyol A having a number average molecular weight of 500 to 850 and a high-molecular-weight polyol B having a number average molecular weight of 900 to 1500 jointly. It is further preferable that both high-molecular-weight polyols are hydrophobic. By using both high-molecular-weight polyols jointly, it becomes easy to adjust a hardness, a specific gravity and a tensile breaking extension of a polyurethane resin foam in objective ranges. A ratio of blending a high-molecular-weight polyol A and a high-molecular-weight polyol B is preferably A/B=5/95 to 35/65 (wt %), more preferably A/B=10/90 to 30/70 (wt %), particularly preferably A/B=20/80 to 30/70 (wt %).

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. Still other examples that can be used together with the high-molecular-weight polyol also include: alcoholamines such as monoethanolamine, 2-(2-aminoethylamino)ethanol, monopropanolamine and the like. The low-molecular-weight polyols and the low-molecular-weight polyamines may be used either alone or in combination of two or more kinds. A mixing quantity of each of a low-molecular-weight polyol and a low-molecular-weight polyamine is not specifically limited and properly determined so as to match characteristics required for a manufactured polishing pad (a polishing layer). A molecular weight of the low-molecular-weight polyol or the low-molecular-weight polyamine is less than 500, preferably not more than 250.

In the case where a polyurethane resin foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5.5'-dimethyldiphenylmethane, 4,4'-diamino-3,3',5,5'-tetraisopropyldiphenylmethane, 1,2-bis(2-aminophenylthio) ethane, 4,4'-diamino-3,3'-diethyl-5.5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more. Especially preferably used are halogen free aromatic diamines such as 3,5-bis(methylthio)-2,4-toluenediamine and 3,5-bis(methylthio)-2,6-toluenediamine.

A ratio between an isocyanate component, a polyol component and a chain extender in the invention can be altered in various ways according to molecular weights thereof, desired physical properties of a polishing pad and the like. In order to obtain a polishing pad with desired polishing characteristics, a ratio of the number of isocyanate groups in an isocyanate component relative to a total number of active hydrogen groups (hydroxyl groups+amino groups) in a polyol component and a chain extender is preferably in the range of from 0.80 to 1.20 and more preferably in the range of from 0.99 to 1.15. When the number of isocyanate groups is outside the aforementioned range, there is a tendency that curing deficiency is caused, required tensile breaking extension, specific gravity and hardness are not obtained, and polishing property is deteriorated.

A polyurethane resin foam can be produced by applying a melting method, a solution method or a known polymerization technique, among which preferable is a melting method, consideration being given to a cost, a working environment and the like.

Manufacture of a polyurethane resin foam is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent.

Note that an isocyanate-terminated prepolymer with a molecular weight of the order in the range of from 800 to 5000 is preferable because of excellency in workability and physical properties.

Manufacture of the polyurethane resin foam is to mix the first component containing an isocyanate group containing compound and the second component containing an active hydrogen group containing compound to thereby cure the reaction product. In the prepolymer method, an isocyanate-terminated prepolymer serves as an isocyanate group containing compound and a chain extender serves as an active hydrogen group containing compound. In the one shot method, an isocyanate component serves as an isocyanate group containing compound, and a chain extender and a polyol component combined serves as an active hydrogen containing compound.

Manufacturing methods of a polyurethane resin foam include: a method in which hollow beads are added, a mechanically foaming method, a chemically foaming method and the like.

Particularly, a mechanically foaming method using a silicone-based surfactant having no active hydrogen group which is a copolymer of polyalkylsiloxane and polyether is preferable. As such the silicone-based nonionic surfactant, L5340 (manufactured by Nihonunica Corporation) etc. are exemplified as a suitable compound.

Various additives may be mixed; such as a stabilizer including an antioxidant, a lubricant, a pigment, a filler, an antistatic agent and others.

Description will be given of an example of a method of producing a polyurethane resin foam of a fine cell type constituting a polishing pad (a polishing layer) below. A method of manufacturing such a polyurethane resin foam has the following steps:

1) a foaming step of preparing a bubble dispersion liquid of an isocyanate-terminated prepolymer (first component),
wherein a silicone-based nonionic surfactant is added into an isocyanate-terminated prepolymer, which is agitated in the presence of a non-reactive gas to thereby disperse the non-reactive gas into the prepolymer as fine bubbles and obtain a bubble dispersion liquid. In a case where the prepolymer is solid at an ordinary temperature, the prepolymer is preheated to a proper temperature and used in a molten state.
2) a curing agent (chain extender) mixing step,
wherein a chain extender (second component) is added into the bubble dispersion liquid, which is agitated to thereby obtain a foaming reaction liquid.
3) a casting step,
wherein the forming reaction liquid is cast into a mold.
4) a curing step,
wherein the foaming reaction liquid having been cast into the mold is heated and reaction-cured.

The non-reactive gas used for forming fine bubbles is preferably not combustible, and is specifically nitrogen, oxygen, a carbon dioxide gas, a rare gas such as helium and argon, and a mixed gas thereof, and the air dried to remove water is most preferable in respect of cost.

As a stirrer for dispersing the silicone-based nonionic surfactant-containing first component to form fine bubbles with the non-reactive gas, known stirrers can be used without particular limitation, and examples thereof include a homogenizer, a dissolver, a twin-screw planetary mixer etc. The shape of a stirring blade of the stirrer is not particularly limited either, but a whipper-type stirring blade is preferably used to form fine bubbles.

In a preferable mode, different stirrers are used in stirring for forming a bubble dispersion liquid in the stirring step and in stirring for mixing an added chain extender in the mixing step, respectively. In particular, stirring in the mixing step may not be stirring for forming bubbles, and a stirrer not generating large bubbles is preferably used. Such a stirrer is preferably a planetary mixer. The same stirrer may be used in the stirring step and the mixing step, and stirring conditions such as revolution rate of the stirring blade are preferably regulated as necessary.

In the method of producing the polyurethane foam with fine cells, heating and post-curing of the foam obtained after casting and reacting the forming reaction liquid in a mold until the dispersion lost fluidity are effective in improving the physical properties of the foam, and are extremely preferable. The forming reaction liquid may be cast in a mold and immediately post-cured in a heating oven, and even under such conditions, heat is not immediately conducted to the reactive components, and thus the diameters of cells are not increased. The curing reaction is conducted preferably at normal pressures to stabilize the shape of cells.

In the production of the polyurethane foam, a known catalyst promoting polyurethane reaction, such as tertiary amine-based catalysts, may be used. The type and amount of the catalyst added are determined in consideration of flow time in casting in a predetermined mold after the mixing step.

Production of the polyurethane foam may be in a batch system where each component is weighed out, introduced into a vessel and mixed or in a continuous production system where each component and a non-reactive gas are continuously supplied to, and stirred in, a stirring apparatus and the resulting forming reaction liquid is transferred to produce molded articles.

A manufacturing method of a polishing pad may be performed in ways: in one of which a prepolymer which is a raw material from which a polishing pad (a polishing layer) is made is put into a reactor, thereafter a chain extender is mixed into the prepolymer, the mixture is agitated, thereafter the mixture is cast into a mold with a predetermined size to thereby prepare a block and the block is sliced with a slicer like a planer or a band saw; and in another of which in the step of casting into the mold, a thin sheet may be directly produced. Besides, a still another way may be adopted in which a resin of raw material is melted, the melt is extruded through a T die to thereby mold a polyurethane resin foam directly in the shape of a sheet.

An average cell diameter of a polyurethane resin foam is preferably in the range of from 30 to 80 µm and more preferably in the range of from 30 to 60 µm. If an average cell diameter falls outside the range, a tendency arises that a polishing rate is decreased and a planarity of an object to be polished (a wafer) after polishing is reduced.

A polishing pad (polishing layer) of the invention is preferably provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

No specific limitation is placed on a thickness of a polishing layer, but a thickness thereof is about 0.8 to 4 mm, preferably 1.0 to 2.5 mm. The method of preparing the polishing layer of this thickness includes a method wherein a block of the fine-cell foam is cut in predetermined thickness by a slicer in a bandsaw system or a planing system, a method that involves casting resin into a mold having a cavity of predetermined thickness and curing the resin, a method of using coating techniques and sheet molding techniques, etc.

The range of the thickness of the polishing layer is preferably 100 µm or less. When the range of the thickness is higher than 100 µm, large undulation is caused to generate portions different in a contacting state with an object of polishing, thus adversely influencing polishing characteristics. To solve the range of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

As a method of suppressing the range of thickness, there is also a method of buffing the surface of the polishing layer having a predetermined thickness. Buffing is conducted preferably stepwise by using polishing sheets different in grain size.

A polishing pad of the invention may also be a laminate of a polishing layer and a cushion sheet adhered to each other.

The cushion sheet (cushion layer) compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the polishing pad of the present invention is preferably softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

Means for adhering the polishing layer to the cushion layer include: for example, a method in which a double sided tape is sandwiched between the polishing layer and the cushion layer, followed by pressing.

The double sided tape is of a common construction in which adhesive layers are provided on both surfaces of a substrate such as a nonwoven fabric or a film. It is preferable to use a film as a substrate with consideration given to prevention of permeation of a slurry into a cushion sheet. A composition of an adhesive layer is, for example, of a rubber-based adhesive, an acrylic-based adhesive or the like. An acrylic-based adhesive is preferable because of less of a content of metal ions, to which consideration is given. Since a polishing layer and a cushion sheet is sometimes different in composition from each other, different compositions are adopted in respective adhesive layers of double sided tape to thereby also enable adhesive forces of the respective adhesive layers to be adjusted to proper values.

A polishing pad of the invention may be provided with a double sided tape on the surface of the pad adhered to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad (a polishing layer) 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing head 5 side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

[Measurement and Evaluation Method]

(Measurement of Number-Average Molecular Weight)

A number-average molecular weight was measured by GPC (a Gel Permeation Chromatography) and a value as measured was converted in terms of standard polystyrene molecular weight, and the apparatus and conditions in operation were as follows:
GPC apparatus was an apparatus manufactured by Shimadzu Corp., with Model Number of LC-10A.
Columns that were used in measurement were ones manufactured by Polymer Laboratories Co., in which three columns were in connection including (PL gel, 5 μm and 500 Å), (PL gel, 5 μm and 100 Å) and (PL gel, 5 μm and 50 Å).
A flow rate was 1.0 ml/min.
A concentration was 1.0 g/l.
An injection quantity was 40 μl.
A column temperature was 40° C.
An eluent was tetrahydrofuran.

(Measurement of Tensile Breaking Extension and Tensile Strength)

According to JIS K7312-1996, a prepared polyethylene resin foam was punched into a shape of dumbbell No. 3 to obtain a sample. The sample was aged for 24 hours under condition of 22° C. and 66% RH and, thereafter, a tensile test was performed. A tensile breaking extension and a tensile strength were measured. As a tensile tester, Instron Universal Testing Machine (Model 4300, manufactured by Instron) was used and, as a software, a video extension meter controlled by series IX was used.

(Measurement of Average Cell Diameter)

A manufactured polyurethane resin foam was sliced with a microtome cutter into measurement samples each with the thinnest possible thickness of 1 mm or less. A surface of a sample was photographed with a scanning electron microscope (manufactured by Hitachi Science System Co. with a model number of S-3500N) at a magnification of ×100. An effective circular diameter of each of all cells in an arbitrary area was measured with an image analyzing soft (manufactured by MITANI Corp. with a trade name WIN-ROOF) and an average cell diameter was calculated from the measured values.

(Measurement of Specific Gravity)

Determined according to JIS Z8807-1976. A manufactured polyurethane resin foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).

(Measurement of Hardness)

Measurement is conducted according to JIS K6253-1997. A manufactured polyurethane resin foam cut out in a size of 2 cm×2 cm (thickness: arbitrary) was used as a sample for measurement of hardness and left for 16 hours in an environment of a temperature of 23±2° C. and a humidity of 50%±5%. At the time of measurement, samples were stuck on one another to a thickness of 6 mm or more. A hardness meter (Asker D hardness meter, manufactured by Kobunshi Keiki Co., Ltd.) was used to measure hardness.

(Evaluation of Polishing Characteristics)

Using SPP600S (manufactured by Okamoto Machine Tool Works, Ltd.) as a polishing apparatus, and using a prepared polishing pad, a polishing rate was assessed. A thermally oxidized membrane of 1 μm was made on a silicon wafer of 8 inch, one of the membrane was polished above 0.5 μm, and an initial polishing rate was calculated from a time thereupon. In addition, polishing was repeated by the similar method, to perform polishing for an accumulated time of 10 hours, and a polishing rate after 10 hours was measured. For measuring a thickness of an oxidized membrane, an interference film thickness measuring instrument (manufactured by Otsuka Electronics Co., Ltd.) was used. During polishing, silica slurry (SS12 manufactured by Cabot) was added at a flow rate of 150 ml/min. Polishing loading was 350 g/cm$^2$, the number of revolutions of the polishing platen was 35 rpm, and the number of revolutions of the wafer was 30 rpm.

In addition, for assessing planarity, a thermally oxidized membrane was deposited 0.5 μm on a 8 inch silicon wafer, patterning of L/S (line and space)=25 μm/5 μm and L/S=5 μm/25 μm was performed, and an oxidized membrane (TEOS) was further deposited 1 μm to prepare a wafer with a pattern at an initial step of 0.5 μm. This wafer was polished under the aforementioned polishing condition, and an abrasion amount of a bottom part of a 25 μm space was measured at a global step of 2000 Å or smaller, thereby, planarity was assessed. As a value of an abrasion amount is smaller, planarity can be said to be excellent.

(Measurement of Dressing Speed)

A surface of a manufactured polishing pad was uniformly dressed with a diamond dresser (manufactured by Asahi Diamond Co. with a trade name of M Type #100 in the shape of a circle with a diameter of 20 cm) while being rotated. A dresser load at this time was set to 450 g/cm$^2$, a polishing platen rotation number was set to 30 rpm, a dresser rotation number was set to 15 rpm and a dressing time was set to 100 min. A dressing speed was calculated from thickness values of the polishing pad as measured before and after dressing.

(Assessment of Clogging)

Whether there is clogging in a groove on a polishing pad surface after the aforementioned polishing for 10 hours or not was visually confirmed, and clogging was assessed based on the following criteria.

○: A ratio of clogging is less than 10% of all grooves.

Δ: A ratio of clogging is not less than 10% and less than 20% of all grooves.

x: A ratio of clogging is not less than 20% of all grooves.
(Assessment of Scratch)

After a first wafer was polished under the aforementioned condition, how many streaks of 0.2 μm or larger are on a wafer was measured using a wafer surface testing apparatus (WM2500) manufactured by TOPCON CORPORATION.

First Invention

Example 1

A reactor was charged with 35 parts by weight of toluene diisocyanate (manufactured by Mitsui Takeda Chemicals, Inc., a mixture of toluene 2, 4-diisocyanate/toluene 2,6-diisocyanate=80/20), 15.75 parts by weight of 4,4'-dicyclohexylmethane diisocyanate, 44.3 parts by weight of polytetramethylene glycol A (manufactured by Mitsubishi Chemical Co., Ltd., a number average molecular weight 650), and 4.95 parts by weight of 1,3-butylene glycol (manufactured by Nacalai Tesque, Inc.), and the mixture was heated and stirred at 80° C. for 120 minutes to obtain an isocyanate-terminal prepolymer A (NCO wt %: 11.6 wt %).

Separately, a reactor was charged with 31.9 parts by weight of toluene diisocyanate (manufactured by Mitsui Takeda Chemicals, Inc., a mixture of toluene 2, 4-diisocyanate/toluene 2, 6-diisocyanate=80/20), 8.5 parts by weight of 4,4'-dicyclohexylmethane diisocyanate, 53.9 parts by weight of polytetramethylene glycol B (manufactured by Mitsubishi Chemical Co., Ltd., a number average molecular weight 1000), and 5.7 parts by weight of diethylene glycol (manufactured by Mitsubishi Chemical Co., Ltd.), and the mixture was heated and stirred at 80° C. for 120 minutes to obtain an isocyanate-terminal prepolymer B (NCO wt %: 9.2 wt %).

And, a reactor was charged with 45 parts by weight of an isocyanate-terminal prepolymer A, 55 parts by weight of an isocyanate-terminal prepolymer B, and 6 parts by weight of a silicone-based nonionic surfactant L5340 (manufactured by Nihonunica Corporation) (4.38% by weight in a polyurethane resin), and a temperature was adjusted at 80° C. Polytetramethylene glycol A/polytetramethylene glycol B=40/60 (wt %). Thereafter, stirring was performed vigorously at a rotation number of 900 rpm for about 4 minutes using a stirring wing so that pores were taken into a reaction system. 31 parts by weight of 4,4'-methylenebis(o-chloroaniline) (manufactured by Ihara Chemical Industry Co., Ltd., Ihara Cureamine MT) which had been melted at 120° C. in advance was added thereto. After stirring was continued for about 1 minute, the reaction solution was poured into a pan-type open mold. At a timepoint at which flowability of this reaction solution was lost, it was placed into an oven, and post-cured at 110° C. for 6 hours to obtain a polyurethane resin foam block. This polyurethane resin foam was sliced using a band saw-type slicer (manufactured by Fecken) to obtain a polyurethane resin foam sheet. Then, this sheet was surface-buffed to a predetermined thickness using a buffing machine (manufactured by Amitec Corporation) to obtain a sheet with an adjusted thickness precision (sheet thickness: 1.27 mm). This buffing-treated sheet was punched into a predetermined diameter (61 cm), and a sheet surface was subjected to concentric groove processing at a groove width of 0.25 mm, a groove pitch of 1.50 mm, and a groove depth of 0.40 mm to prepare a polishing layer. Thereafter, a cushion material (cushion layer) obtained by impregnating a commercially available non-woven fabric with polyurethane was laminated on a back of the polishing layer to prepare a polishing pad.

Example 2

A reactor was charged with 60 parts by weight of an isocyanate-terminal prepolymer A, 40 parts by weight of an isocyanate-terminal prepolymer B, and 6 parts by weight of a silicone-based nonionic surfactant L5340 (manufactured by Nihonunica Corporation) (4.35% by weight in a polyurethane resin), a temperature was adjusted at 80° C. Polytetramethylene glycol A/polytetramethylene glycol B=55/45 (wt %). Thereafter, stirring was performed vigorously at a rotation number of 900 rpm for about 4 minutes using a stirring wing so that pores were taken into a reaction system. 32 parts by weight of 4,4'-methylenebis(o-chloroaniline) (manufactured by Ihara Chemical Industry Co., Ltd, Ihara Cureamine MT) which had been melted at 120° C. in advance was added thereto. Thereafter, according to the same manner as that of Example 1, a polishing pad was prepared.

Example 3

A reactor was charged with 70 parts by weight of an isocyanate-terminal prepolymer A, 30 parts by weight of an isocyanate-terminal prepolymer B, and 6 parts by weight of a silicone-based nonionic surfactant L5340 (manufactured by Nihonunica Corporation) (4.32% by weight in a polyurethane resin), and a temperature was adjusted at 80° C. Polytetramethylene glycol A/polytetramethylene glycol B=65/35 (wt %). Thereafter, stirring was performed vigorously at a rotation number of 900 rpm for about 4 minutes using a stirring wing so that pores are taken into a reaction system. 32.8 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Example 4

A reactor was charged with 70 parts by weight of an isocyanate terminal prepolymer A, 30 parts by weight of an isocyanate-terminal prepolymer B and 6 parts by weight of a silicone-based nonionic surfactant L5340 (manufactured by Nihonunica Corporation) (4.32 parts by weight in a polyurethane resin), and a temperature was adjusted at 80° C. Polytetramethylene glycol A/polytetramethylene glycol B=65/35 (wt %). Thereafter, stirring was performed vigorously at a rotation number of 900 rpm for about 4 minutes using a stirring wing so that pores were taken into a reaction system. 25.9 parts by weight of Ethacure 300 (manufactured by Albemarle Corporation, a mixture of 3,5-bis(methylthio)-2,6-toluenediamine and 3,5-bis(methylthio)-2,4-toluenediamine) which had been adjusted at a temperature of 70° C. in advance was added thereto. Thereafter, according to the same manner as that of Example 1, a polishing pad was prepared.

Comparative Example 1

A reactor was charged with 50 parts by weight of diisocyanate (manufactured by Mitsui Takeda Chemicals, Inc., a mixture of toluene 2,4-diisocyanate/toluene 2, 6-diisocyanate=80/20), 15.75 parts by weight of 4,4'-dicyclohexylmethane diisocyanate, 44.3 parts by weight of polytetramethylene glycol (manufactured by Mitsubishi Chemical Co., Ltd., a number average molecular weight 650), and 4.95 parts by weight of 1,3-butylene glycol (manufactured by Nacalai Tesque, Inc.), and the mixture was heated and stirred at 80° C. for 120 minutes to obtain an isocyanate-terminal prepolymer C(NCO wt %: 16.1 wt %).

A reactor was charged with 100 parts by weight of an isocyanate-terminal prepolymer C, and 6 parts by weight of a silicone-based nonionic surfactant L5340 (manufactured by Nihonunica Corporation) (3.88% by weight in a polyurethane resin), and a temperature was adjusted at 80° C. Thereafter, stirring was performed vigorously at a rotation number of 900 rpm for about 4 minutes using a stirring wing so that pores were taken into a reaction system. 48.5 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Comparative Example 2

A reactor was charged with 100 parts by weight of an isocyanate-terminal prepolymer B and 10 parts by weight of a silicone-based nonionic surfactant L5340 (manufactured by Nihonunica Corporation) (7.34% by weight in a polyurethane resin), and a temperature was adjusted at 80° C. Thereafter, stirring was performed vigorously at a rotation number of 900 rpm for about 4 minutes using a stirring wing so that pores were taken into a reaction system. 26.2 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Comparative Example 3

A reactor was charged with 100 parts by weight of an isocyanate-terminal prepolymer B, and 3 parts by weight of a silicone-based nonionic surfactant SH-192 (manufactured by Toray Dow Corning Silicone Co., Ltd.) (2.32% by weight in a polyurethane resin), and a temperature was adjusted at 80° C. Thereafter, stirring was performed vigorously at a rotation number of 900 rpm for about 4 minutes using a stirring wing so that pores were taken into a reaction system. 26.2 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Using polishing pads obtained in Examples and Comparative Examples, a polishing test was performed to assess polishing property. Results are shown in Table 1.

Second Invention

Example 1

A reactor was charged with 35 parts by weight of a toluene diisocyanate (manufactured by Mitsui Takeda Chemicals, Inc., a mixture of toluene 2, 4-diisocyanate/toluene 2, 6-diisocyanate=80/20), 15.75 parts by weight of 4,4'-dicyclohexylmethane diisocyanate, 44.3 parts by weight of polytetramethylene glycol (manufactured by Mitsubishi Chemical Co., Ltd., a number average molecular weight 650), and 4.95 parts by weight of 1,3-butylene glycol (manufactured by Nacalai Tesque, Inc.), and the mixture was heated and stirred at 80° C. for 120 minutes to obtain an isocyanate-terminal prepolymer A (NCO wt %: 11.6 wt %).

And, a reactor was charged with 100 parts by weight of an isocyanate-terminal prepolymer A, and 20 parts by weight of a silicone-based nonionic surfactant L5340 (manufactured by Nihonunica Corporation) (13% by weight in a polyurethane resin), and a temperature was adjusted at 80° C. Thereafter, stirring was performed vigorously at a rotation number of 900 rpm for about 4 minutes using a stirring wing so that pores were taken into a reaction system. 34 parts by weight of 4,4'-methylenebis(o-chloroaniline) (manufactured by Ihara Chemical Industry Co., Ltd., Ihara Cureamine MT) which had been melted at 120° C. in advance was added thereto. After stirring was continued for about 1 minute, the reaction solution was poured into a pan-type open mold. At a timepoint at which flowability of this reaction solution was lost, the solution was placed into an oven, and post-cured at 110° C. for 6 hours to obtain a polyurethane resin foam block. This polyurethane resin foam block was sliced using a band sawtype slicer (manufactured by Fecken) to obtain a polyurethane resin foam sheet. Then, this sheet was surface-buffed to a predetermined thickness using a buffing machine (manufactured by Amitec Corporation) to obtain a sheet with an adjusted thickness precision (sheet thickness: 1.27 mm). This buff-treated sheet was punched out into a predetermined diameter (61 cm), and a sheet surface was subjected to concentric groove processing at a groove width of 0.25 mm, a

TABLE 1

| | NCO wt % (average value) | Tensile breaking extension (%) | Tensile strength (MPa) | Average cell diameter (µm) | Specific gravity | Hardness (degree) | Initial polishing rate (Å/min) | Polishing rate after 10 hours (Å/min) | Abrasion amount (Å) | Dressing speed (µm/min) | Clogging | Scratch (number) |
|---|---|---|---|---|---|---|---|---|---|---|---|---|
| Example 1 | 10.28 | 87.7 | 19 | 51 | 0.8 | 57 | 2350 | 2300 | 2550 | 7.7 | ○ | 5 |
| Example 2 | 10.64 | 66.5 | 19.7 | 52 | 0.8 | 60 | 2380 | 2250 | 2250 | 7.5 | ○ | 4 |
| Example 3 | 10.88 | 50 | 20.8 | 50 | 0.8 | 62 | 2420 | 2320 | 2300 | 8.2 | ○ | 5 |
| Example 4 | 10.88 | 56.1 | 21.2 | 49 | 0.8 | 61 | 2320 | 2300 | 2250 | 8.1 | ○ | 5 |
| Comparative Example 1 | 16.1 | 15 | 20.3 | 53 | 0.8 | 75 | 2150 | 2100 | 2100 | 18.3 | ○ | 19 |
| Comparative Example 2 | 9.2 | 148.9 | 17.7 | 53 | 0.77 | 42 | 2200 | 1750 | 3650 | 4.8 | Δ | 5 |
| Comparative Example 3 | 9.2 | 162 | 24.3 | 52 | 0.86 | 54 | 2100 | 1530 | 3100 | 4.1 | × | 4 |

From results of Table 1, it is seen that, by using a polyurethane resin foam having a tensile breaking extension of 25 to 120% as a material for a polishing layer, a polishing pad which hardly generates a scratch in a polishing object and is excellent in planarization property is obtained. In addition, it is seen that, in the polishing pad of the invention, a polishing rate is hardly reduced even when continuously used for a long period of time.

groove pitch of 1.50 mm and a groove depth of 0.40 mm using a groove processing machine (manufactured by Toho Koki Co., Ltd.) to prepare a polishing layer. Thereafter, a cushion material (cushion layer) obtained by impregnating a commercially available non-woven fabric with polyurethane was laminated on a back of the polishing layer to prepare a polishing pad.

Example 2

According to the same manner as that of Example 1 except that 28 parts by weight of Ethacure 300 (manufactured by Albemarle Corporation, a mixture of 3,5-bis(methylthio)-2,6-toluenediamine and 3,5-bis(methylthio)-2,4-toluenediamine) was used in place of 34 parts by weight of 4,4'-methylenebis(o-chloroaniline) in Example 1, a polishing pad was prepared.

Example 3

According to the same manner as that of Example 1 except that an amount of a silicone-based nonionic surfactant L5340 was changed from 20 parts by weight to 15 parts by weight in Example 1, a polishing pad was prepared.

Example 4

A reactor was charged with 35 parts by weight of toluene diisocyanate (manufactured by Mitsui Takeda Chemicals, Inc., a mixture of toluene 2, 4-diisocyanate/toluene 2, 6-diisocyanate=80/20), 15.75 parts by weight of 4,4'-dicyclohexylmethane diisocyanate, 44.5 parts by weight of polyester polyol (number average molecular weight 650) obtained by polycondensing adipic acid and diethylene glycol at 150° C., and 4.95 parts by weight of 1,3-butylene glycol (manufactured by Nacalai Tesque, Inc.), and the mixture was heated and stirred at 80° C. for 120 minutes to obtain an isocyanate-terminal prepolymer B (NCO wt %: 11.5 wt %).

According to the same manner as that of Example 1 except that 100 parts by weight of an isocyanate-terminal prepolymer B was used in place of 100 parts by weight of an isocyanate-terminal prepolymer A in Example 1, a polishing pad was prepared.

Comparative Example 1

According to the same manner as that of Example 1 except that an amount of a silicone-based nonionic surfactant L5340 was changed from 20 parts by weight to 5 parts by weight in Example 1, a polishing pad was prepared.

Comparative Example 2

According to the same manner as that of Example 1 except that an amount of a silicone-based nonionic surfactant L5340 was changed from 20 parts by weight to 40 parts by weight in Example 1, a polishing pad was prepared.

Comparative Example 3

A reactor was charged with 32.1 parts by weight of a toluene diisocyanate (manufactured by Mitsui Takeda Chemicals, Inc., a mixture of toluene 2, 4-diisocyanate/toluene 2, 6-diisocyanate=80/20), 8.5 parts by weight of 4,4'-dicyclohexylmethane diisocyanate, 54.3 parts by weight of polytetramethylene glycol (manufactured by Mitsubishi Chemical Co., Ltd., a number average molecular weight 1000), and 4.9 parts by weight of 1,3-butylene glycol (manufactured by Nacalai Tesque, Inc.), and the mixture was heated and stirred at 80° C. for 120 minutes to obtain an isocyanate-terminal prepolymer C(NCO wt %: 9.1 wt %).

According to the same manner as that of Example 1 except that 100 parts by weight of an isocyanate-terminal prepolymer C was used in place of 100 parts by weight of an isocyanate-terminal prepolymer A, and an amount of 4,4'-methylenebis(o-chloroaniline) was changed from 34 parts by weight to 26 parts by weight in Example 1, a polishing pad was prepared.

Using polishing pads obtained in Examples and Comparative Examples, a polishing test was performed to assess polishing property. Results are shown in Table 2.

TABLE 2

| | Surfactant (wt %) | Average cell diameter (µm) | Specific gravity | Askar D hardness (degree) | Tensile strength (MPa) | Tensile breaking extension (%) | Initial polishing rate (Å/min) | Polishing rate after 10 hours (Å/min) | Abrasion amount (Å) | Scratch (number) |
|---|---|---|---|---|---|---|---|---|---|---|
| Example 1 | 13.0 | 51 | 0.78 | 56 | 16.9 | 60 | 2790 | 2810 | 2150 | 3 |
| Example 2 | 13.5 | 50 | 0.77 | 55 | 15.9 | 68 | 2890 | 2850 | 2050 | 4 |
| Example 3 | 10.1 | 51 | 0.76 | 58 | 17.3 | 55 | 2950 | 2970 | 2220 | 3 |
| Example 4 | 13.0 | 51 | 0.75 | 61 | 19.3 | 75 | 3050 | 3000 | 2100 | 5 |
| Comparative Example 1 | 3.6 | 55 | 0.95 | 71 | 25.5 | 22 | 2050 | 1750 | 2300 | 23 |
| Comparative Example 2 | 23.0 | 50 | 0.7 | 46 | 14.8 | 135 | 1980 | 1520 | 3700 | 6 |
| Comparative Example 3 | 13.7 | 51 | 0.73 | 42 | 13.2 | 141 | 2030 | 1610 | 3850 | 7 |

As apparent from results of Table 2, by using a hydrophobic high-molecular-weight polyol having a number average molecular weight of 500 to 850 as a polyol component, and adding 10 to 20% by weight of a silicone-based nonionic surfactant having no hydroxy group to a polyurethane resin foam, a polishing pad which has a high polishing rate and is excellent in planarization property can be obtained. The polishing pad can suppress generation of scratch on a wafer.

Third Invention

Example 1

A reactor was charged with 35 parts by weight of toluene diisocyanate (manufactured by Mitsui Takeda Chemicals, Inc., a mixture of toluene 2, 4-diisocyanate/toluene 2, 6-diisocyanate=80/20), 15.75 parts by weight of 4,4'-dicyclohexylmethane diisocyanate, 44.3 parts by weight of polytetramethylene glycol (manufactured by Mitsubishi Chemical, Co., Ltd., a number average molecular weight 650), and 4.95 parts by weight of 1,3-butylene glycol (manufactured by Nacalai Tesque, Inc.), and the mixture was heated and stirred at 80° C. for 120 minutes to obtain an isocyanate-terminal prepolymer A (NCO wt %: 11.6 wt %).

Separately, a reactor was charged with 31.9 parts by weight of toluene diisocyanate (manufactured by Mitsui Takeda Chemicals, Inc., a mixture of toluene 2, 4-diisocyanate/toluene 2, 6-diisocyanate=80/20), 8.5 parts by weight of 4,4'-dicyclohexylmethane diisocyanate, 53.9 parts by weight of polytetramethylene glycol (manufactured by Mitsubishi Chemical. Co., Ltd., a number average molecular weight 1000), and 5.7 parts by weight of diethylene glycol (manufactured by Mitsubishi Chemical Co., Ltd.), and the mixture was heated and stirred at 80° C. for 120 minutes to obtain an isocyanate-terminal prepolymer B (NCO wt %: 9.2 wt %).

And, a reactor was charged with 35 parts by weight of an isocyanate-terminal prepolymer A, 65 parts by weight of an isocyanate-terminal prepolymer B, and 10 parts by weight of a silicone-based nonionic surfactant L5340 (manufactured by Nihonunica Corporation) (7.19% by weight in a polyurethane resin), and a temperature was adjusted at 80° C. Polytetramethylene glycol A/polytetramethylene glycol B=30/70 (wt %). Thereafter, stirring was performed vigorously at a rotation number of 900 rpm for about 4 minutes using a stirring wing so that pores were taken into a reaction system. 29 parts by weight of 4,4'-methylenebis(o-chloroaniline) (manufactured by Ihara Chemical Industry Co., Ltd., Ihara Cureamine MT) which had been melted at 120° C. in advance was added thereto. After stirring was continued for about 1 minute, the reaction solution was poured into a pan-type open mold. At a timepoint at which flowability of this reaction solution was lost, the solution was placed into an oven, and post-cured at 110° C. for 6 hours to obtain a polyurethane resin foam block. This polyurethane resin foam block was sliced using a band saw-type slicer (manufactured by Fecken) to obtain a polyurethane resin foam sheet. Then, this sheet was surface-buffed to a predetermined thickness using a buffing machine (manufactured by Amitec Corporation) to obtain a sheet with an adjusted thickness precision (sheet thickness: 1.27 mm). This bath-treated sheet was punched out into a predetermined diameter (61 cm), and a sheet surface was subjected to concentric groove processing at a groove width of 0.25 mm, a groove pitch of 1.50 mm and a groove depth of 0.40 mm using a groove processing machine (manufactured by Toho Koki Co., Ltd.) to prepare a polishing layer. Thereafter, a cushion material (cushion layer) obtained by impregnating a commercially available non-woven fabric with polyurethane was laminated on a back of the polishing layer to prepare a polishing pad.

Example 2

According to the same manner as that of Example 1 except that 23 parts by weight of Ethacure 300 (manufactured by Albemarle Corporation, a mixture of 3,5-bis(methylthio)-2,6-toluene diamine and 3,5-bis(methylthio)-2,4-toluenediamine) was used in place of 29 parts by weight of 4,4'-methylenebis(o-chloroaniline) in Example 1, a polishing pad was prepared.

Example 3

A reactor was charged with 25 parts by weight of an isocyanate-terminal prepolymer A, 75 parts by weight of an isocyanate-terminal prepolymer B, and 6 parts by weight of a silicone-based nonionic surfactant L5340 (manufactured by Nihonunica Corporation) (4.48% by weight in a polyurethane resin), and a temperature was adjusted at 80° C. Polytetramethylene glycol A/polytetramethylene glycol B=21/79 (wt %). Thereafter, stirring was performed vigorously at a rotation number of 900 rpm for about 4 minutes using a stirring wing so that pores were taken into a reaction system. 28 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Comparative Example 1

A reactor was charged with 100 parts by weight of an isocyanate-terminal prepolymer A, and 20 parts by weight of a silicone-based nonionic surfactant L5340 (manufactured by Nihonunica Corporation) (12.9% by weight in a polyurethane resin), and a temperature was adjusted at 80° C. Thereafter, stirring was performed vigorously at a rotation number of 900 rpm for about 4 minutes using a stirring wing so that pores were taken into a reaction system. 35 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Comparative Example 2

A reactor was charged with 100 parts by weight of an isocyanate-terminal prepolymer B, and 6 parts by weight of a silicone-based nonionic surfactant L5340 (manufactured by Nihonunica Corporation) (4.54% by weight in a polyurethane resin), and a temperature was adjusted at 80° C. Thereafter, stirring was performed vigorously at a rotation number of 900 rpm for about 4 minutes using a stirring wing so that pores were taken into a reaction system. 26.2 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Comparative Example 3

A reactor was charged with 100 parts by weight of an isocyanate-terminal prepolymer B, and 3 parts by weight of a silicone-based nonionic surfactant SH-192 (manufactured by Toray Dow Corning Silicone Co., Ltd.) (2.32% by weight in a polyurethane resin), and a temperature was adjusted at 80° C. Thereafter, stirring was performed vigorously at a rotation number of 900 rpm for about 4 minutes using a stirring wing so that pores were taken into a reaction system. 26.2 parts by weight of 4,4'-methylenebis(o-chloroaniline) (manufactured by Ihara Chemical Industry Co., Ltd., Ihara Cureamine MT) which had been melted at 120° C. in advance was added thereto. Thereafter, according to the same manner as that of Example 1, a polishing pad was prepared.

Using polishing pads obtained in Examples and Comparative Examples, a polishing test was performed to assess polishing property. Results are shown in Table 3. In the case of Comparative Example 1, a groove on a pad surface was lost by abrasion 8 hours after polishing.

TABLE 3

|  | Surfactant (wt %) | Average NCO (wt %) | Average cell diameter (μm) | Specific gravity | Askar D hardness (degree) | Tensile strength (MPa) | Tensile breaking extension (%) | Initial polishing rate (Å/min) | Polishing rate after 10 hours (Å/min) | Dressing speed (μm/min) | Clogging |
|---|---|---|---|---|---|---|---|---|---|---|---|
| Example 1 | 7.19 | 10 | 51 | 0.82 | 53 | 23 | 141 | 2300 | 2250 | 7.5 | ○ |
| Example 2 | 7.52 | 10 | 50 | 0.83 | 54 | 22.1 | 129 | 2400 | 2310 | 7.2 | ○ |
| Example 3 | 4.48 | 9.8 | 51 | 0.8 | 53 | 22.3 | 145 | 2350 | 2280 | 6.9 | ○ |
| Comparative Example 1 | 12.90 | 11.6 | 52 | 0.55 | 42 | 19.2 | 54 | 2200 | — | 23.3 | — |
| Comparative Example 2 | 4.54 | 9.2 | 53 | 0.7 | 41 | 16.3 | 155 | 2150 | 1350 | 4.8 | x |
| Comparative Example 3 | 2.32 | 9.2 | 53 | 0.92 | 56 | 23.8 | 181 | 1900 | 1430 | 3.2 | x |

From results of Table 3, by using a polyurethane resin foam having an Askar D hardness of 45 to 55 degree, a specific gravity of 0.8 to 0.86, and a tensile breaking extension of 120 to 150%, a polishing pad can be obtained in which abrasive grains and polishing swarf are hardly clogged in a groove during polishing, and a polishing rate is hardly reduced even when continuously used for a long period of time.

What is claimed is:

1. A polishing pad comprising a polyurethane resin foam having a fine cell, and containing a polishing layer having a depression and protrusion structure on a polishing surface, wherein the polyurethane resin foam has an Askar D hardness of 45 to 55 degree, a specific gravity of 0.8 to 0.86, and a tensile breaking extension of 120 to 150%,
wherein the polyurethane resin foam is a reaction cured body of an isocyanate-terminal prepolymer A, an isocyanate-terminal prepolymer B and a chain extender the isocyanate-terminal prepolymer A comprising a polyol A having a number average molecular weight of 500 to 650 and an isocyanate component, the isocyanate-terminal prepolymer B comprising a polyol B having a number average molecular weight of 900 to 1500 and an isocyanate component, a content ratio of the polyols (polyol A/polyol B) being 20/80~35/65 (wt %), and an average NCO wt % of each of the isocyanate-terminal prepolymers A and B being 9.8 to 10.5% by weight.

2. The polishing pad according to claim 1, wherein the polyurethane resin foam has a tensile strength of 15 to 25 MPa.

3. The polishing pad according to claim 1, wherein the chain extender is aromatic diamine.

4. The polishing pad according to claim 3, wherein the aromatic diamine is 3,5-bis(methylthio)-2,4-toluenediamine and/or 3,5-bis(methylthio)-2,6-toluenediamine.

5. The polishing pad according to claim 1, wherein the isocyanate component is aromatic diisocyanate and cycloaliphatic diisocyanate.

6. The polishing pad according to claim 5, wherein the aromatic diisocyanate is toluene diisocyanate, and the cycloaliphatic diisocyanate is dicyclohexylmethane diisocyanate.

7. The polishing pad according to claim 1, wherein the polyurethane resin foam contains a silicone-based nonionic surfactant having no hydroxy group at 0.05 to 10% by weight.

8. The polishing pad according to claim 1, wherein a dressing speed is 5 to 10 μm/min.

* * * * *